United States Patent
Lewis

(10) Patent No.: US 6,526,506 B1
(45) Date of Patent: Feb. 25, 2003

(54) MULTI-LEVEL ENCRYPTION ACCESS POINT FOR WIRELESS NETWORK

(75) Inventor: Daniel E. Lewis, The Woodlands, TX (US)

(73) Assignee: Telxon Corporation, Akron, OH (US)

(*) Notice: Subject to any disclaimer, the term of this patent is extended or adjusted under 35 U.S.C. 154(b) by 0 days.

(21) Appl. No.: 09/257,341

(22) Filed: Feb. 25, 1999

(51) Int. Cl.[7] .................................................. H04L 9/00
(52) U.S. Cl. ...................................... 713/153; 380/278
(58) Field of Search ................................ 713/153, 154, 713/160; 380/270, 272, 281, 284, 278; 370/338, 349; 455/3.01

(56) References Cited

U.S. PATENT DOCUMENTS

| | | | |
|---|---|---|---|
| 5,299,263 A | 3/1994 | Beller et al. | |
| 5,313,521 A | 5/1994 | Torii et al. | |
| 5,515,439 A | 5/1996 | Bantz et al. | |
| 5,604,801 A | 2/1997 | Dolan et al. | |
| 5,726,984 A | * 3/1998 | Kubler et al. | 370/349 |
| 5,850,444 A | 12/1998 | Rune | |
| 5,875,186 A | * 2/1999 | Belanger et al. | 370/331 |
| 5,889,861 A | 3/1999 | Ohashi et al. | |
| 6,016,348 A | 1/2000 | Blatter et al. | |
| 6,047,066 A | 4/2000 | Brown et al. | |
| 6,052,715 A | 4/2000 | Fukui et al. | |
| 6,075,860 A | 6/2000 | Ketcham | |
| 6,097,817 A | 8/2000 | Bilgic et al. | |
| 6,101,531 A | 8/2000 | Eggleston et al. | |
| RE36,946 E | 11/2000 | Diffie et al. | |
| 6,182,214 B1 | 1/2001 | Hardjono | |
| 6,373,946 B1 | 4/2001 | Johnston | |
| 6,321,095 B1 | 11/2001 | Gavette | |

* cited by examiner

*Primary Examiner*—Mathew Smithers
(74) *Attorney, Agent, or Firm*—Renner, Otto, Boisselle & Sklar, LLP

(57) ABSTRACT

A multi-level encryption scheme is provided for a wireless network. A first level of encryption is provided primarily for wireless communications taking place between a mobile terminal and an access point. In addition, a second, higher level of encryption is provided which is distributed beyond the wireless communications onto the system backbone itself. Through a key distribution server/access point arrangement, the second level of encryption provides a secure means for distributing the encryption scheme of the first level without compromising the integrity of the network.

11 Claims, 10 Drawing Sheets

SYSTEM DEVICE TABLE 152

| AUTHORIZED DEVICE ID | NON-ENCRYPT ACCESS? | ACCESS EXPIRATION? |
|---|---|---|
| AP1 | N | N |
| AP2 | N | N |
| . | . | . |
| . | . | . |
| . | . | . |
| MT1 | N | N |
| MT2 | N | N |
| MT3 | N | N |
| BMT(72) | Y | Y (1 WEEK) |
| . | . | . |
| . | . | . |
| . | . | . |

Fig.4

CLEAR TABLE 126

| DEVICE ID |
|---|
| BMT 72 |

MULTI-LEVEL ENCRYPTION ACCESS POINT FOR WIRELESS NETWORK

TECHNICAL FIELD

The present invention relates generally to wireless networks, and more particularly to an encryption scheme and access point for providing two or more levels of encryption to prevent unauthorized access to the network.

BACKGROUND OF THE INVENTION

In recent years, the use of wireless communication systems having mobile transceivers which communicate with a hardwired network, such as a local area network (LAN) or a wide area network (WAN), has become widespread. The mobile transceivers, commonly referred to as mobile terminals, may take one of several different forms. For instance, in retail stores hand-held scanning units may be used to allow for scanning inventory bar codes. In a warehouse, portable units mounted to a vehicle may be used to gather information from the warehouse floor. In a medical environment, the mobile terminal may take the form of a pen based workslate which allows medical personnel to work with full page screens at once.

In a typical wireless communication system or "wireless network", each mobile terminal communicates with a networked system via a radio or optical link in order to allow for a real time exchange of information. The mobile terminals communicate through one of several access points interconnected to the network. The access points allow for a wireless data communication path to be formed.

Associated with each access point is a geographic cell. A cell is a geographic area in which an access point has sufficient signal strength to transmit data to and receive data from a mobile terminal with an acceptable error rate. Typically, access points will be positioned along the backbone such that the combined cell area coverage from each access point provides full coverage of a building or site.

Mobile terminals are designed to be carried throughout the system from cell to cell. Each mobile terminal is capable of communicating with the system backbone via wireless communications between the mobile terminal and an access point to which the mobile device is currently registered. As the mobile terminal is portable and roams from one cell to another, the mobile terminal will typically reassociate itself with a new access point each time the mobile terminal enters a new cell thereby causing the former access point to which the mobile terminal was associated to deregister the mobile terminal.

Information exchanged between mobile terminals and access points is generally sent in packet format. Packets of information (also referred to herein simply as "packets" or "data packets") are a defined set of data bits which carry information such as source address, destination address, synchronization bits, data, error correcting codes, etc. One standard communication protocol for transmitting packets of information between mobile terminals and access points is the IEEE 802.11 standard, although other protocols exist.

Of particular concern in wireless networks is network security. A mobile terminal which is granted unauthorized access to the wireless network has the ability to compromise the integrity of the network. For example, an unauthorized mobile terminal may engage in unauthorized communications and/or eavesdrop on the wireless transmissions. This can lead to undesirable or even catastrophic results in the case where an unauthorized mobile terminal is permitted to delete, alter or otherwise detrimentally affect data within the network.

Suppose, for example, a wireless network is operating in accordance with the IEEE 802.11 protocol. Mobile terminals which are capable of communicating in accordance with the 802.11 protocol are readily available from many manufacturers and are capable of operating within the wireless network. An individual wishing to compromise the integrity of the network may obtain such a mobile terminal and effectively eavesdrop on communications occurring between authorized mobile terminals and access points within the network. By eavesdropping on such communications, the individual may then ascertain a system ID within the network. The individual may then proceed to place unauthorized traffic on the network using the unauthorized mobile terminal.

The 802.11 protocol does include some degree of security in the form of a wired equivalent privacy (WEP) standard. Ideally, the WEP standard provides a degree of security equivalent to a hard-wired communication link. However, there are difficulties in implementing the WEP standard in many wireless networks. For example, there is no apparent teaching as to how the WEP standard may be used to provide security in a wireless network in which one or more mobile terminals may exist which are authorized to communicate on the network but which themselves are not capable of encrypting communications in accordance with WEP. Moreover, there is no apparent teaching as to how the information necessary for communicating using the WEP standard can be reliably exchanged in a wireless network without potentially breaching the security of the network.

In view of the aforementioned shortcomings associated with existing wireless networks, there exists a strong need in the art for a wireless network which permits secure communications without substantial risk of compromise. In particular, there is a strong need for a wireless network which enables secure communications among mobile terminals capable of engaging in secure communications. At the same time, there is a strong need for a wireless network which is still capable of permitting communications by authorized mobile terminals requiring a non-secure format.

SUMMARY OF THE INVENTION

A multi-level encryption scheme is provided for a wireless network. A first level of encryption is provided primarily for wireless communications taking place between a mobile terminal and an access point. In addition, however, a second, higher level of encryption is provided which is distributed beyond the wireless communications onto the system backbone itself. The second level of encryption provides a secure means for distributing the encryption scheme of the first level without compromising the integrity of the network.

According to one aspect of the invention, an access point is provided which includes a transceiver for wirelessly communicating with mobile terminals; an interface for coupling the access point to a system backbone; an encryption engine for encrypting messages using a first encryption key which are to be transmitted to a mobile terminal via the transceiver, and for decrypting messages using the first encryption key which are received from the mobile terminal via the transceiver; operational means for determining whether a message received via the transceiver has been encrypted using the first encryption key and, based on such determination, selectively forwarding the message to a destination on the system backbone specified in the message if the message had been encrypted, and at least one of forwarding the message to a predefined destination on the system backbone, blocking the message from being placed onto the system backbone, and placing the message onto the system backbone if the message had not been encrypted.

According to another aspect of the invention, an access point is provided which includes a transceiver for wirelessly communicating with mobile terminals; an interface for coupling the access point to a system backbone; a memory which stores mobile terminal identifiers indicating which mobile terminals which are to be permitted access to the system backbone, and whether such permitted access is secure access or non-secure access; control means, operatively coupled to the transceiver and the memory, for determining whether a received communication is from a mobile terminal which is permitted access to the system backbone; and means for processing the received communication based on whether the mobile terminal is permitted access.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4 represents a system device table maintained within the key distribution server in accordance with the present invention;

FIG. 5 represents a clear table maintained within a given access point in accordance with the present invention;

DESCRIPTION OF THE PREFERRED EMBODIMENTS

Figure 1:
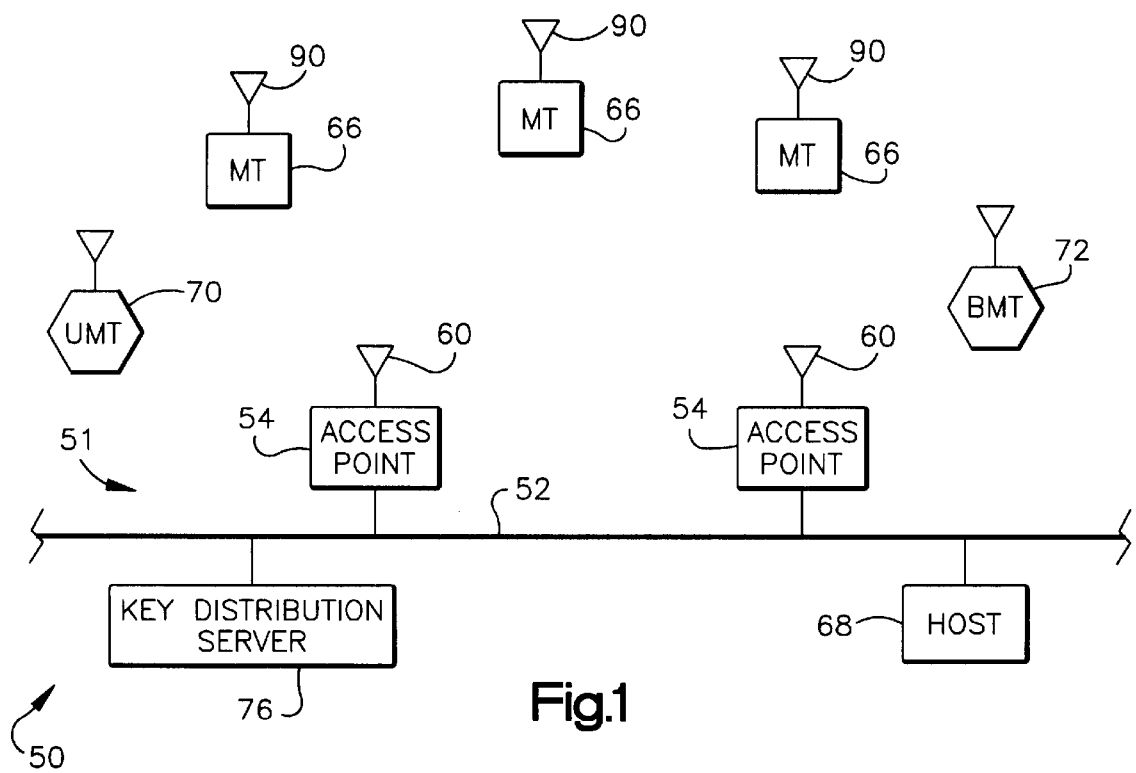
FIG. 1 is a system diagram illustrating a wireless network in accordance with the exemplary embodiment of the present invention.

The present invention will now be described with reference to the drawings, wherein like reference numerals are used to refer to like elements throughout.

Referring now to FIG. 1, a wireless communication system 50 is shown in accordance with the exemplary embodiment of the present invention. The wireless communication system 50, also referred to herein as a wireless network, includes a network 51 having a hardwired data communication path 52. The hardwired data communication path may be made of twisted pair cable, shielded coaxial cable or fiber optic cable, for example, and is often referred to as the system backbone 52. Connected to the system backbone 52 are several access points 54. Each access point 54 serves as an entrance point through which wireless communications may occur with the system backbone 52.

Each access point 54 includes a radio and is capable of wirelessly communicating with other devices in the system 50 via an antenna 60. A geographic cell associated with each access point 54 defines a region, or area of coverage, in which successful wireless communications may occur. Depending on the type of antenna 60 selected and the output power of the respective access point, the cell may take one of several different forms and sizes as will be readily appreciated.

The wireless communication system 50 also includes one or more mobile terminals 66. As is explained more fully in connection with FIG. 2, each mobile terminal 66 includes a radio which allows the mobile terminal 66 to communicate with devices on the system backbone 52 via a respective access point 54. In order to carry out communications, each mobile terminal 66 will attempt to register with a nearby access point 54 using conventional techniques. In the event a mobile terminal 66 roams from one cell to another, each mobile terminal 66 is configured to register itself with the access point 54 for the new cell while deregistering with the access point 54 of the previous cell. Techniques for permitting the registration, deregistration and overall roaming of mobile terminals are well known, and hence are not described in detail herein for sake of brevity.

A host computer 68 is coupled to the system backbone 52 and performs host functions within the system 50 as is conventional. For example, information obtained by each of the mobile terminals 66 is transmitted to the host computer 68 via the particular access point 54 with which the mobile terminal 66 is registered. Similarly, the host computer 68 can communicate with the mobile terminals 66 via the access point 54 with which the particular mobile terminal is registered.

The wireless communication system 50 may be of the type utilized in retail stores or warehouses, for example. Such systems are useful for tracking inventory and replenishing stock. Employees may enter inventory information using hand-held or portable mobile terminals 66 which can be carried throughout a store or warehouse. As an example, a mobile terminal 66 may include a bar code reader for reading inventory information in a warehouse. The information thus entered into the mobile terminal 66 can then be transferred to the system backbone 52 via an access point 54. Similarly, information from the system backbone 52 may be transmitted to the mobile terminal 66 via an access point 54.

Regardless of whether the system 50 is utilized in a store, warehouse, hospital, etc., there is likely to be instances where confidential, proprietary, or otherwise sensitive information is to be communicated wirelessly between a mobile terminal 66 and an access point 54. Absent any type of encryption, an unauthorized mobile terminal (UMT) such as that shown at 70 could potentially eavesdrop on wireless communications between a mobile terminal 66 and an access point 54 as noted above. An operator of the UMT 70 could thereby gain access to sensitive information which may be highly undesirable. Moreover, such eavesdropping can enable the operator of the UMT 70 to gain access to the system backbone 52 and potentially be able to place traffic onto the system backbone 52.

On the other hand, simply encrypting all communications between a mobile terminal 66 and an access point 54 can raise other problems which are hereby addressed by the present invention. For example, how is an encryption key used for communications between a mobile terminal 66 and an access point 54 distributed to the mobile terminals 66? Moreover, it may be desirable that the encryption key be changed frequently. How are mobile terminals 66 newly introduced into the system 50 provided with the current encryption key? Additionally, it may be desirable that a "basic" mobile terminal (BMT) such as that shown at 72 be capable of accessing the network 51 without engaging in secure encrypted communications. For example, a BMT 72 may be a low cost device without an encryption engine yet still be intended to form part of the system 50. In such case, the issue arises as to how the BMT 72 may still be granted access to the network 51 despite being unable to engage in secure communications?

The system 50 of the present invention offers a unique solution to such problems with the introduction of a key distribution server which operates in tandem with the access points 54 to provide a second, higher level of encryption. As is shown in FIG. 1, the system 50 further includes a key distribution server 76 which is coupled to the system backbone 52. As will be explained in more detail below in connection with FIGS. 3, 4 and 8, the key distribution key server 76 is responsible for providing authorized mobile terminals 66 access to the encryption key within the system. The encryption key itself is encrypted by the key distribution server, thereby preventing unauthorized mobile terminals 70 from accessing the encryption key themselves.

In addition, the distribution key server 76 enables authorized BMTs 72 to gain access to the network 51 even in a non-secure format. Thus, BMTs 72 may still gain access to the network 51 whereas UMTs 70 are denied access. The distribution key server 76 also functions to inform the access points 54 of which mobile terminals are authorized to communicate on the network 51, and attends to changing the encryption key used for secure communications between the access points 54 and the mobile terminals 66.

As will be described in more detail below in relation to FIGS. 2, 5, 7 and 9 the access points 54 operate in conjunction with the key distribution server 76 to ensure system integrity. Messages received by an access point 54 from a mobile terminal are first evaluated to determine whether the messages have been encrypted by the encryption key. Messages which have been encrypted are passed onto the system backbone 52. An access point 54 detects messages which are received but have not been encrypted, and determines whether the source of such message is entitled to access to the network 51 nevertheless. If yes, the message is passed onto the system backbone 52. Otherwise, the message is either blocked from the system backbone 52 or routed to a specific location on the system backbone 52 for further evaluation/unauthorized access detection.

Figure 2:
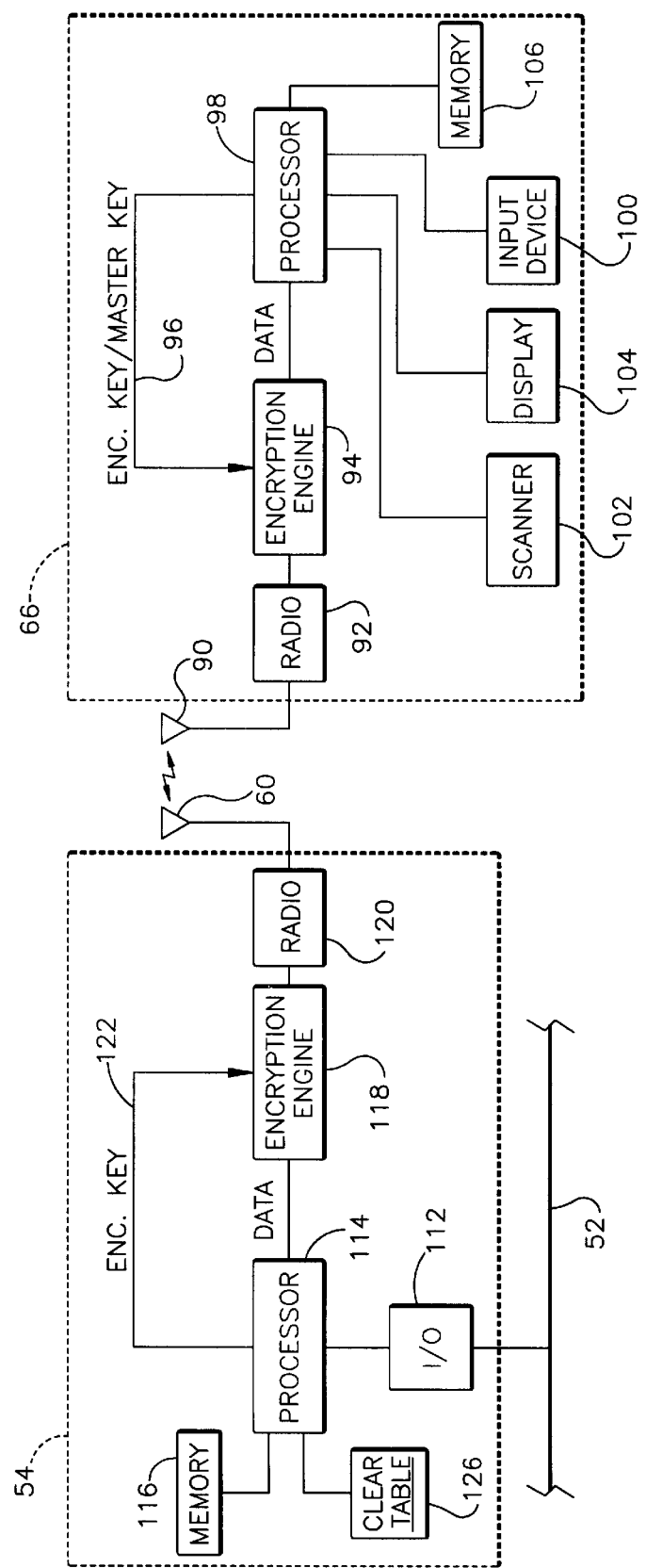
FIG. 2 is a block diagram representing a wireless communication between an access point and a mobile terminal in accordance with the present invention.

Referring now to FIG. 2, the basic configuration of an exemplary access point 54 and mobile terminal 66 is shown. Initially describing the mobile terminal 66, each mobile terminal 66 includes an antenna 90 for receiving and transmitting signals. The antenna 90 is connected to a radio section 92 which is configured to transmit and receive messages in the form of information packets according to the IEEE 802.11 protocol, for example. Messages received by the radio 92 via the antenna 90 are input to an encryption engine 94 included in the mobile terminal 66. The encryption engine 94 is conventional in that it decrypts encrypted messages which have been received based on an encryption key provided to the encryption engine. In the exemplary embodiment, the encryption engine 94 receives an encryption key provided on line 96 from a processor 98 included in the mobile terminal 66. The processor 98 selectively controls the particular encryption key provided on line 96, and/or chooses to omit an encryption key in order to forego encryption/decryption.

Messages which have been decrypted by the encryption engine 94 are provided to the processor 98 for subsequent processing in accordance with conventional techniques. The encryption engine 94 also serves to encrypt messages which are provided from the processor 98 to the radio 92 for transmission to an access point 52. Again, such encryption is based on the particular encryption key provided to the encryption engine 94 on line 96. The radio 92 in turn transmits the encrypted message.

As is conventional, the encryption engine 94 can successfully decrypt messages only when provided with the same encryption key on line 96 used to encrypt the messages originally. In addition, in the exemplary embodiment messages which are transmitted between the various devices within the system 50 are in the form of packets. Each packet includes a header field followed by a data field. The header field includes source address and destination address information. The data field includes the particular data involved in the relevant applications. In the exemplary embodiment, the encryption engine 94 (along with the other encryption engines described herein) encrypts and decrypts only the data field. Thus, the header field including the source address and destination address remains non-encrypted at all times. In another embodiment, however, both the header and data fields may be encrypted.

As will be discussed in more detail below, the processor 98 selectively provides to the encryption engine 94 two different types of encryption keys. The first type is referred to herein as an "ENCRYPT" key. The ENCRYPT key is used to encrypt/decrypt standard messages which are transmitted between an access point 54 and a mobile terminal 66. The ENCRYPT key may be similar to the encryption key used in the aforementioned WEP protocol in an IEEE 802.11 standard. Once a mobile terminal 66 has the ENCRYPT key and is able to communicate securely with an access point 54 using the same ENCRYPT key, the particular value or composition of the ENCRYPT key may be changed periodically. For example, an access point 54 can provide a mobile terminal 66 with a new ENCRYPT key using the previous ENCRYPT key and instruct the processor 98 in the mobile terminal 66 to begin using the new ENCRYPT key.

The processor 98 also selectively provides to the encryption engine 94 a second type of encryption key which is referred to herein as a "MASTER" key. As will be more fully explained below in association with FIGS. 6–9, the MASTER key is used to encrypt messages which are transmitted between the mobile terminal 66 and the key distribution server 76. The MASTER key is programmed into the mobile terminal 66 by a system administrator and/or is directly input into the mobile terminal 66 by an operator. The MASTER key is used to encrypt a message which the mobile terminal 66 sends to the key distribution server 76 requesting the particular ENCRYPT key to be used with standard communications with the access point 54. Thus, a mobile terminal 66 must have the MASTER key to communicate successfully such a request to the key distribution server 76 as more fully explained below.

The processor 98 is responsible for controlling the general operation of the mobile terminal 66 with respect to processing and storing information received and transmitted by the radio section 92. The processor 98 is programmed to control and to operate the various components within the mobile terminal 66 in order to carry out the various functions described herein. An operator input device 100 is coupled to the processor 98 which allows an operator to input data to be communicated to the system backbone 52 or the host computer 68 such as inventory data, ordering information, and the like. The input device 100 can include such items as a keypad, touch sensitive display, etc. The mobile terminal 66 also may include a bar code scanner 1 02 coupled to the processor 98 for providing another form of data input.

A display 104 is also connected to and controlled by the processor 98. The display 104 serves as a means for displaying information stored within the mobile terminal 66 and/or received over the system backbone 52 or the host computer 68 via an access point 54. The display 104 can be a flat panel liquid crystal display with alphanumeric capabilities, for example, or any other type of display as will be appreciated.

A memory 106 is included in each mobile terminal 66 for storing program code executed by the processor 98 for carrying out the functions described herein. The actual code for performing such functions could be easily programmed by a person having ordinary skill in the art of computer programming in any of a number of conventional programming languages based on the disclosure herein. Consequently, further detail as to the particular code has been omitted for sake of brevity. The components making up the mobile terminal 66 are preferably housed in a palm-sized housing, making the mobile terminal 66 highly portable and easy to carry from location to location.

Still referring to FIG. 2, each access point 54 is connected to the system backbone 52 via a network adapter transceiver 112 included in the access point. The network adapter transceiver 112 is configured according to conventional network adapter transceiver techniques to allow the access point 54 to communicate over the system backbone 52. The access point 54 further includes a processor 114 for controlling and carrying out the operations of the access point.

The access point 54 includes a memory 116 coupled to the processor 114. The memory 116 stores program code executed by the processor 114 for controlling the other elements within the access point 54 to carry out the functions described herein. It will be readily apparent to a person having ordinary skill in the art of microprocessor programming how to program the processor 114 and the other elements within the access point 154 to carry out the operations described herein using conventional programming techniques based on the flowcharts and descriptions provided herein. As a result, additional detail as to the specific program code has been omitted. The memory 116 also serves to buffer packets of information such as those received over the system backbone 52 or those transmitted to or received from the mobile terminals 66.

Similar to the radio 92 and encryption engine 94 included in the mobile terminals 66, each access point 54 includes an encryption engine 118 and a radio 120. The access point radio 120 receives messages from mobile terminals 66 via its antenna 60. Received messages are provided by the radio 120 to the encryption engine 118. The encryption engine 118 decrypts the messages based on an encryption key selectively provided on line 122 from the processor 114. The decrypted messages are then provided to the processor 114 for conventional processing. Likewise, messages which are to be transmitted by the access point 54 to a mobile terminal 66 are provided by the processor 114 to the encryption engine 118. The encryption engine 118 in turn encrypts the messages based on the encryption key provided on line 122, and the encrypted messages are provided to the radio 120 which then transmits each encrypted message via the antenna 60.

In the case of the access point 54, the processor 114 provides only the ENCRYPT key to the encryption engine 118. Thus, messages received from the mobile terminals 66 which have been encrypted by the ENCRYPT key are successfully decrypted by the access point 54. Likewise, the mobile terminals 66 are able to decrypt successfully messages from an access point 54 when the mobile terminals 66 are in possession of the ENCRYPT key.

Each access point 54 further includes a "clear" table 126 which is maintained in digital memory coupled to the processor 114. Although the clear table 126 is shown as being separate from the memory 116, it will be appreciated that the clear table 126 may in fact be maintained within the memory 116. As will be described in more detail below in connection with FIG. 5, each access point 54 maintains in the clear table 126 a list of devices. Such devices (e.g., mobile terminals) are those which are authorized to communicate with the network 51 via the access point 54 and the system backbone 52 in a non-encrypted, non-secure format.

Figure 3:
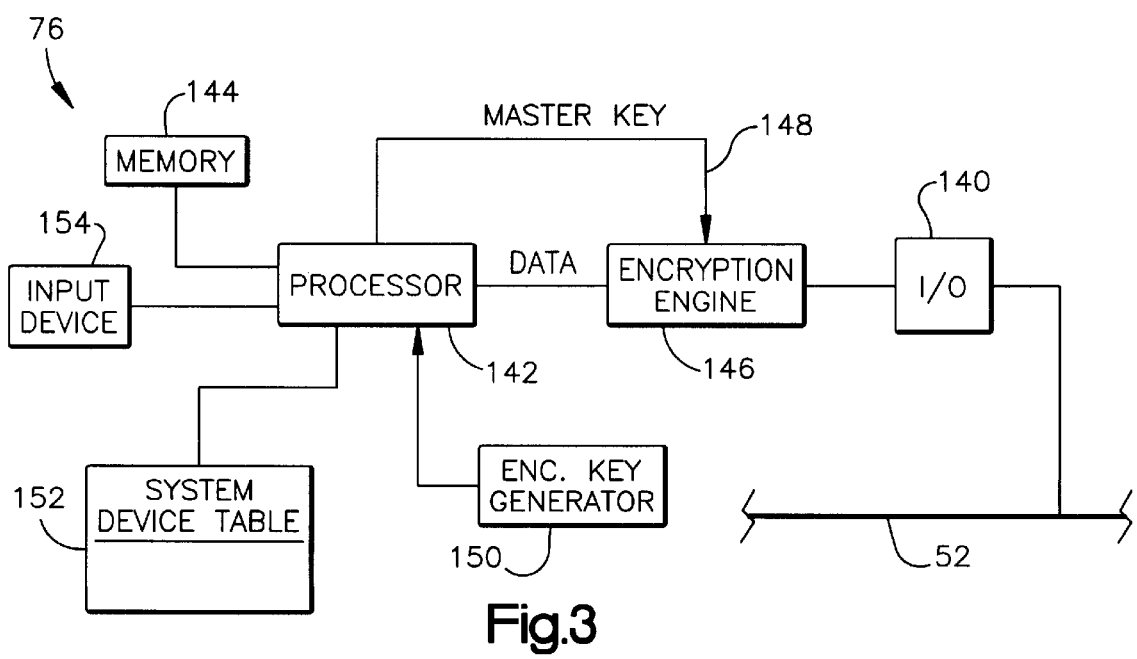
FIG. 3 is a block diagram of a key distribution server in accordance with the present invention.

Referring now to FIG. 3, the key distribution server 76 is illustrated in more detail. Similar to the access points 54, the key distribution server 76 is connected to the system backbone 52 via a network adapter transceiver 140 included in the server 76. The network adapter transceiver 140 also is configured according to conventional network adapter transceiver techniques to allow the key distribution server 76 to communicate over the system backbone 52.

The key distribution server 76 further includes a processor 142 for controlling and carrying out the operations of the key distribution server 76. In addition, the key distribution server 76 includes a memory 144 coupled to the processor 114. The memory 144 stores program code executed by the processor 142 for controlling the other elements within the server to carry out the functions described herein. It will be readily apparent to a person having ordinary skill in the art of microprocessor programming how to program the processor 142 and the other elements within the server to carry out the operations described herein using conventional programming techniques based on the flowcharts and descriptions provided herein. As a result, additional detail as to the specific program code has been omitted. The memory 144 also serves to buffer packets of information such as those received over the system backbone 52.

Similar to the mobile terminals 66 and the access points 54, the key distribution server 76 includes its own encryption engine 146. The key distribution server 76 receives messages directed to the server from the system backbone 52 via the network adaptor transceiver 140. Specifically, received messages are provided to the encryption engine 146. The encryption engine 146 decrypts the messages based on an encryption key selectively provided on line 148 from the processor 142. The decrypted messages are then provided to the processor 142 for processing. Likewise, messages which are to be transmitted by the key distribution server 76 to a mobile terminal 66 are provided by the processor 142 to the encryption engine 146. The encryption engine 146 in turn encrypts the messages based on the encryption key provided on line 148, and the encrypted messages are then delivered to the system backbone 52. In the case of messages directed to mobile terminals 66, as is conventional, the access point 54 with which the destination mobile terminal 66 is registered will detect and receive the packet intended for the destination mobile terminal 66. The access point 54 will in turn transmit the message to the destination mobile terminal 66.

In the case of the key distribution server 76, the processor 142 selectively provides the aforementioned MASTER key to the encryption engine 146. The same system administrator responsible for informing the operators of the mobile terminals 66 of the MASTER key and/or programming the MASTER key into the mobile terminals 66 as discussed below, is also responsible for inputting the same MASTER key into the key distribution server 76 via an input means such as a keyboard.

As is discussed more fully below, the key distribution server 76 will receive requests from mobile terminals 66 desiring access to the system 20. The requests are for the current ENCRYPT key so that the mobile terminal will be able to communicate securely with the access point 54 and gain access to the system. Such requests are encrypted by the mobile terminals 66 using the MASTER key, and the encryption engine 146 decrypts such requests using the same MASTER key. In response to such requests, the key distribution server 76 provides the ENCRYPT key to the requesting mobile terminal 66 in a message encrypted using the MASTER key. With respect to other messages sent by the key distribution server 76, such as to the access points 54 specifically, the processor 142 does not provide the MASTER key to the encryption engine. Hence, such messages are not encrypted and thus can be received and interpreted by the access points 54.

The key distribution server 76 further includes an optional encryption key generator 150. In the exemplary embodiment, the generator 150 periodically generates a new ENCRYPT key which is provided to the access points 54 in order to be used in communicating with the mobile terminals 66.

The key distribution server 76 also includes what is referred to herein as a "system device" table 152 which is maintained in digital memory coupled to the processor 142. Although the system device table 152 is shown as being separate from the memory 144, it will be appreciated that the table 152 may in fact be maintained within the memory 144. As will be described in more detail below in connection with FIG. 4, the key distribution server 76 maintains in the system device table 152 a list of devices. Such list represents a complete list of devices (e.g., mobile terminals) which are authorized to communicate with the network 51 in either an encrypted or a non-encrypted format. The contents of the system device table 152 are input by a system administrator via an input device 154 (e.g., keypad) coupled to the processor 142, for example. The system administrator represents a person authorized to determine which particular mobile terminals are entitled to gain access within the system 20.

Turning now to FIG. 4, the system device table 152 may be represented as shown by three columns. The first column represents a list of the network address or network identification of each device which is to be granted access to the system 20. The first column will include, for example, the network address or ID of each of the access points 54 in the system (e.g., AP1, AP2, etc.). In addition, the first column will include the network address or ID of each of the authorized mobile terminals 66 (e.g., MT1, MT2, etc.). Furthermore, the first column will included the network address or ID of any other devices (e.g., BMT 72) which are to be permitted some form of access to the system 20.

The second column in the system device table 152 represents whether the corresponding device listed in the first column is entitled to non-encrypted access to the system 20. If no, the second column includes a flag indicating "N" which informs the key distribution server 76 that the device is not to be given non-encrypted access. If yes, the second column includes a flag indicating "Y" which indicates that the corresponding device listed in the first column is entitled to non-encrypted access. Thus, if the system administrator would like for the BMT 72 to be granted non-encrypted access, the corresponding flag in the second column would indicate "Y".

The third column in the system device table 152 indicates whether there are any time limits on the access given to the corresponding devices in the first column. If no, a corresponding flag is set to indicate "N". If yes, a corresponding flag is set to indicate "Y". In addition, the table 152 will have stored therein the particular time limit. For example, the BMT 72 may be designated by the system administrator to have non-encrypted access only for a one week period. The key distribution server 76 uses such information in maintaining the table 152. At the end of the particular time limit specified in the table, the processor 142 in the server 76 will clear the entry from the table.

Referring briefly to FIG. 5, an exemplary clear table 126 maintained in each of the access points 54 is shown. The clear table 126 includes a list of the network addresses or network identifications of those devices identified in the system device table 152 as being granted non-encrypted access to the system 20. The contents of the clear table 126 are updated periodically by update messages provided to the access points 54 from the key distribution server 76 as discussed below in connection with FIGS. 6–9. Thus, for example, the clear table 126 exemplified in FIG. 5 includes the network address or ID of the BMT 72.

Figure 6:
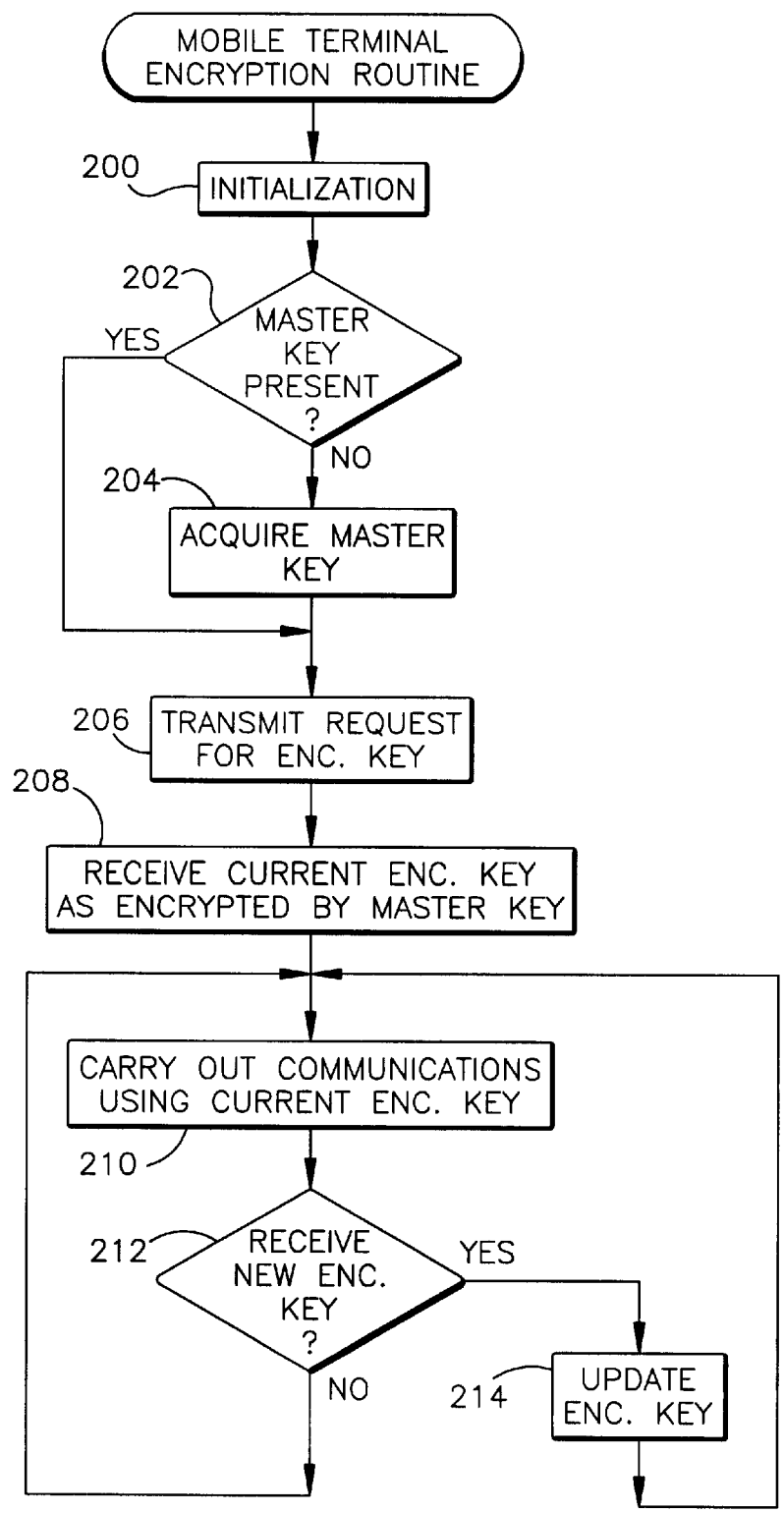
FIG. 6 is a flowchart representing the operation of a given mobile terminal in accordance with the present invention.

Turning now to FIG. 6, the sequence of operations for a mobile terminal 66 seeking access to the system 50 and the network 51 will now be described. Step 200 represents a mobile terminal 66 which is newly introduced into the system 50 and is initially powered up. The mobile terminal 66 will go through a conventional initialization routine in step 200, whereby the mobile terminal 66 seeks out an access point 54 with which it can register. For purposes of the present invention, general registration between a mobile terminal 66 and an access point 54 is presumed to be carried out in a non-encrypted manner such that a communication link between the mobile terminal 66 and the access point 54 may initially be established. It will be appreciated, however, that some form of encryption may also be utilized in the basic registration.

Next, in step 202 the processor 98 within the mobile terminal 66 checks whether the aforementioned MASTER key has been preprogrammed into the mobile terminal 66, the MASTER key being necessary for secure access to the network 51. For example, the memory 106 may have an address location specified for storage of the MASTER key.

The MASTER key may be stored therein as part of an initial set up configuration of the mobile terminal 66. If the MASTER key is not present as determined in step 202, the process proceeds to step 204 in which the mobile terminal 66 attempts to acquire the MASTER key. For example, the processor 98 causes a prompt to appear on the display 104 prompting an operator to input the MASTER key. The MASTER key may be a predefined sequence of alphanumeric characters for example, and an operator may input the MASTER key via the input device 100. Alternatively, the MASTER key may be encoded in a bar code label provided to the operator, for example. The MASTER key may then be input via the scanner 102, for example.

In any event, the MASTER key must either have been previously provided to the mobile terminal 66 or the operator must have been provided access to the MASTER key and the MASTER key input in order to complete step 204. If the MASTER key is not input within a predetermined time (e.g., thirty seconds) in step 204, the mobile terminal 66 is programmed to shut down. If the wrong MASTER key is input, operation will proceed although the mobile terminal will not be able to communicate with the network 51 as discussed below.

Upon the MASTER key having been provided as performed in step 204, the mobile terminal 66 proceeds to step 206. Alternatively, if the MASTER key was already provided within the mobile terminal 66 as determined in step 202 the mobile terminal proceeds directly to step 206. In either case, step 206 involves the mobile terminal 66 attempting to obtain the particular ENCRYPT key which is to be used for secure communications with the access point 54 with which the mobile terminal 66 is registered. In step 206, the mobile terminal 66 is configured to generate a predefined packet requesting the current ENCRYPT key. The mobile terminal 66 is programmed to direct such packet to the predefined network address of the key distribution server 76. Included in the data field for such packet is a request that the mobile terminal 66 be provided with the current ENCRYPTION key.

Referring briefly to FIG. 2, the processor 98 generates the packet requesting the current ENCRYPT key as part of step 206. In addition, the processor 98 provides the aforementioned MASTER key to the encryption engine 94 on line 96 in order that the request packet is encrypted using the MASTER key. The encrypted request packet is then transmitted via the radio 92 and antenna 90 to the access point 54 which receives the encrypted request packet. The access point 54 will attempt to decrypt the message based on the ENCRYPT key provided on line 122. However, since the MASTER key will always be different from the ENCRYPT key such decryption will not be successful.

Accordingly, the access point 54 is configured to forward the non-decrypted request packet in the manner described below in relation to FIG. 7. In particular, the access point 54 forwards the original encrypted request packet onto the system backbone 52 to the key distribution server 76 (FIG. 3). The key distribution server 76 receives the encrypted request packet from the system backbone 52. The request packet is passed through the encryption engine 146 which the processor 142 provides with the MASTER key via line 148. As a result, the key distribution server 76 is able to successfully decrypt the request packet. Provided the mobile terminal 66 is included in the list of authorized devices in table 152, the key distribution server 76 responds to the encrypted request packet with a response packet containing the ENCRYPT key in its data field as is discussed below in relation to FIG. 8. The processor 142 passes the response packet through the encryption engine 146 in order to encrypt the response packet using the MASTER key. The response packet is addressed to the mobile terminal 66 requesting the ENCRYPT key, and is transmitted out onto the system backbone 52.

The access point 54 with which the mobile terminal 66 is registered will detect and receive the response packet by detecting the network address of the mobile terminal in the destination address of the non-encrypted header field. The access points 54, in the preferred embodiment, are also configured to detect from the header field when a packet originates from the key distribution server 76 (as noted from the source address of the header field). In the event a packet originates from the key distribution server 76 as in the case of an ENCRYPT key response packet, the access points 54 are configured not to encrypt the packet via the ENCRYPT key and the encryption engine 118. Rather, the packet is simply forwarded to the destination mobile terminal 66 without encryption via the ENCRYPT key as discussed below in relation to FIG. 9. However, this will not jeopardize system security as will be appreciated since the response packet containing the ENCRYPT key already has been encrypted using the MASTER key by the key distribution server 76. Thus, the mobile terminal 66 may still be informed of the ENCRYPT key via the wireless link without jeopardizing system security.

Following step 206, the mobile terminal 66 continues to provide the MASTER key to the encryption engine 94 via line 96. Thus, when the encrypted response packet containing the ENCRYPT key is received by the mobile terminal 66 it will be successfully decrypted using the MASTER key as represented by step 208. The processor 98 then stores the current ENCRYPT key in memory 106 as provided by the response packet.

Thereafter, the mobile terminal 66 begins to carry out conventional communications in step 210 using the thus-obtained ENCRYPT key in order to maintain security. The processor 98 provides the ENCRYPT key to the encryption engine 94 via line 96. The ENCRYPT key is the same ENCRYPT key used by the access point 54, and hence the wireless communications therebetween may be successfully encrypted and decrypted. Periodically, the access point 54 may be instructed to use a different or new ENCRYPT key as discussed below. The access point 54, in this case, however, can communicate the new ENCRYPT key using the previous ENCRYPT key so as to maintain a secure wireless link even when updating the mobile terminal 66.

Thus, in step 212 the mobile terminal 66 is always checking to determine if a new ENCRYPT key has been received from the access point 54. If not, the mobile terminal 66 returns to step 210. If yes, the mobile terminal 66 proceeds to step 214. In step 214, the mobile terminal 66 receives the packet containing the new ENCRYPT key from the access point 54 and stores the new ENCRYPT key in memory 106. Thereafter, the mobile terminal 66 uses the new ENCRYPT key by providing the new ENCRYPT key to the encryption engine 94 via line 96. Following step 214, the mobile terminal 66 returns to step 210.

Figure 7:
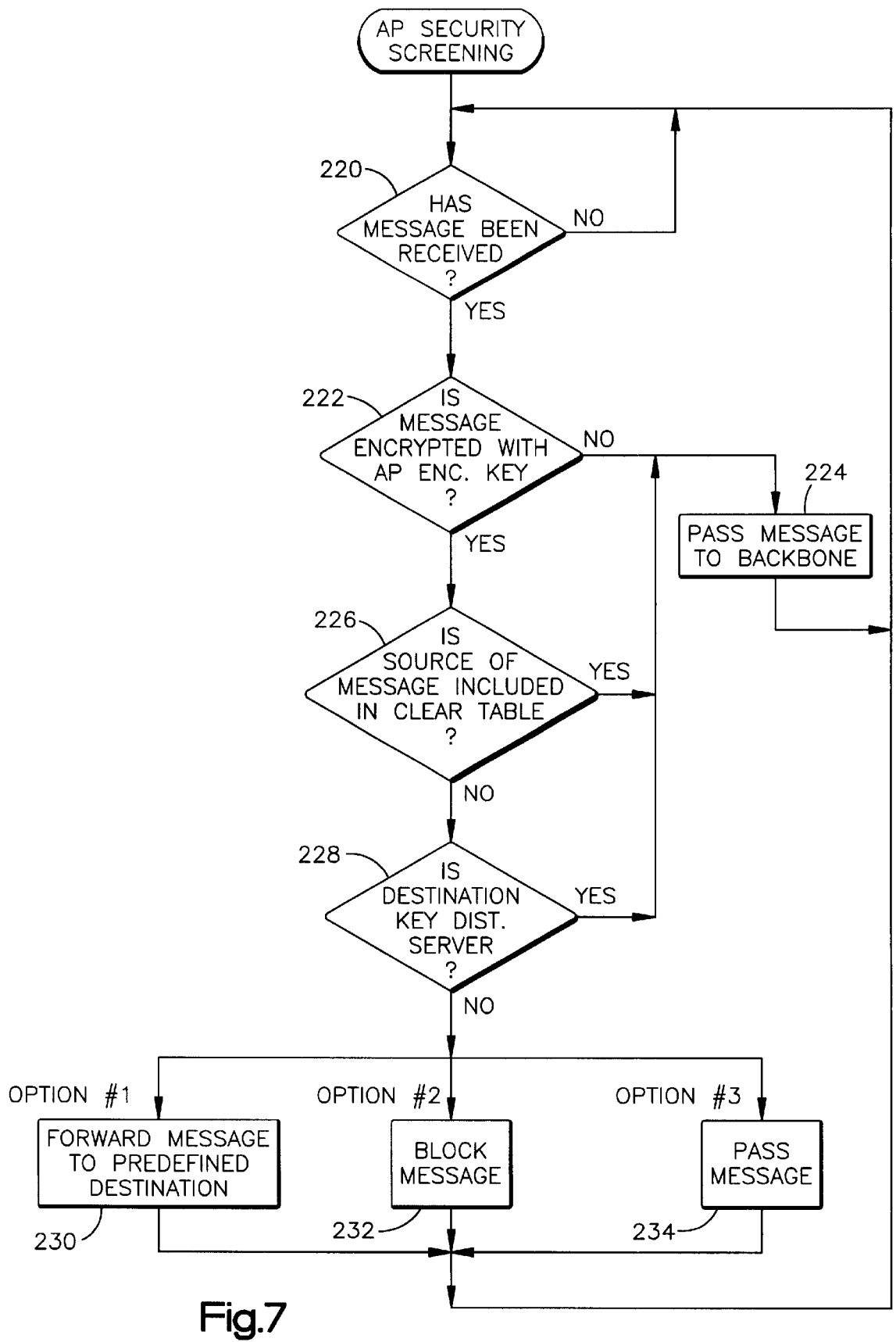
FIG. 7 is a flowchart representing the operation of a given access point in accordance with the present invention.

FIG. 7 represents the screening procedures carried out by the access points 54 in accordance with the invention. Beginning in step 220, the access point 54 determines whether a message has been received via its radio 120 (e.g., a wireless communication with a mobile terminal 66). If no, the access point 54 continues to loop through step 220. If a message has been received, the access point 54 proceeds to step 222 in which the access point 54 determines if the message has been encrypted using the current ENCRYPT key. Specifically, the access point 54 determines if it is able to successfully decrypt the message as output by the encryption engine 118 to the processor 114. Such determination may be based on whether there is satisfactory correlation with a known test portion of data included in the data field of each packet making up the message.

If the message is encrypted using the current ENCRYPT key as determined in step 222, the access point 54 passes the decrypted message onto the system backbone 52 and to its intended destination as represented by step 224. Following step 224, the access point 54 returns to step 220 as shown.

In the event a message is not encrypted using the current ENCRYPT key as determined in step 222, the access point 54 proceeds to step 226. In step 226, the access point 54 determines whether the source of the received message (as identified by the source address in the header field) is included in the clear table 126 (FIGS. 2 and 5). If yes, it indicates that the device sending the message to the access point 54 is authorized and is permitted to communicate in a non-secure manner. Accordingly, the access point 54 forwards the message as originally received (i.e., without decryption) onto the system backbone 52 via step 224.

If the source of the message is not included in the clear table 126 as determined in step 226, the access point 54 proceeds to step 228 in which it determines if the destination address of the message is the key distribution server 76. Specifically, the access point 54 determines if the packets making up the message include the network address of the key distribution server 76 as the destination address in their header field. For example, the request for ENCRYPT key described above in relation to step 206 (FIG. 6) will include the key distribution server 76 as the destination address. If yes in step 228, the access point 54 again will forward the message as originally received (i.e., without decryption) onto the system backbone 52 via step 224.

If no in step 228, the access point 54 is selectively configured to perform one or more of the following options represented by steps 230 thru 234. For example, the access point 54 is configured to forward the potentially unauthorized message to a predefined destination as represented by step 230. In particular, a central location on the network 51 may be predesignated to receive any communications of uncertain character. As a particular example, the key distribution server 76 may serve as a location to which such messages are forwarded. Thus, in step 230 the access point 54 forwards the originally received message (i.e., without decryption) to the key distribution server 76. This prevents an unauthorized message from being routed simply anywhere within the system 51.

Alternatively, following step 228 the access point 54 may simply block the received message as represented by step 232. More particularly, the access point 54 serves simply to clear the message from its memory so as to effectively terminate the message. This completely prevents an unauthorized message from reaching the system backbone 52. Finally, should it be desirable to permit unrestricted access the access point 54 may be configured to pass the originally received message (i.e., without decryption) onto the system backbone 52 as represented in step 234. Each access point 54 can be configured via a set of configuration switches or the like to determine which of the particular options 230–234 are carried out. Following each of steps 230, 232 and 234, the access point 54 returns to step 220 as shown.

Figure 8:
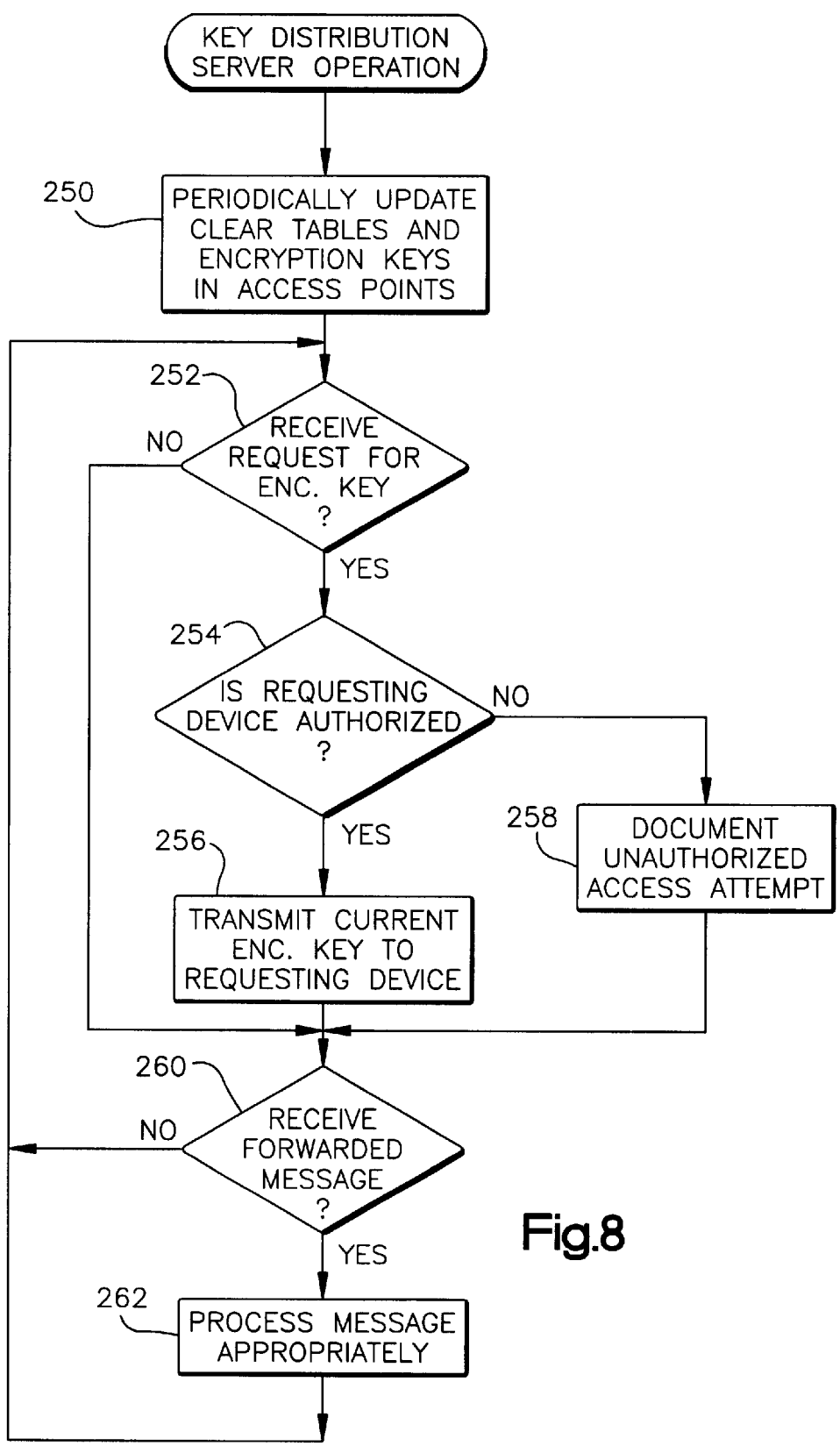
FIG. 8 is a flowchart representing the operation of the key distribution server in accordance with the present invention.

FIG. 8 illustrates the operation of the key distribution server 76 in accordance with the present invention. Step 250 represents a process which is carried out periodically by the key distribution server 76 in order to update the access points 54 within the system 20. In particular, the key distribution server 76 periodically transmits to each of the access points 54 a list of the current devices which are to be provided with non-encrypted access to the system. Such list is based on the contents of the system device table 152 as described above. The access points 54 are programmed to receive such updates and update the contents of their respective clear table 126. The key distribution server 76 also transmits an update of the current ENCRYPT key which is to be utilized by the respective access points 54. The access points 54 are configured to receive the updated ENCRYPT key and to inform the mobile terminals 66 registered thereto as discussed above.

Step 250 is to be carried out periodically by the key distribution server 76 independent of the other steps shown in FIG. 8. Such periodic updates may occur every ten minutes or so, for example.

In step 252, the key distribution server 76 determines if it has received a packet requesting the ENCRYPT key as described above in relation to step 206 (FIG. 6). If yes, the key distribution server 76 determines in step 254 whether the device which sent the request packet is an authorized device. In particular, the key distribution server 76 determines whether the source of the request packet is included in the list of authorized devices in the system device table 152. If yes in step 254, the key distribution server 76 generates and transmits a response packet with the current ENCRYPT key to the requesting device as represented in step 256. The requesting device in turn receives the response packet as discussed above in relation to step 208 (FIG. 6).

If in step 254 the device requesting the ENCRYPT key is not included in the list of authorized devices in table 152, the key distribution server 76 proceeds to step 258. In step 258, the key distribution server 76 documents the request for the ENCRYPT key as an unauthorized attempt to access to the system 20. Such documenting may include storing in memory the time of the request, the request packet itself, and any other information which may be useful in allowing a system administrator to attempt to learn who is trying to gain access to the system. The key distribution server 76 stores such information in its memory 144, for example.

If a request for the ENCRYPT key is not received as determined in step 252, the key distribution server 76 proceeds directly to step 260. Similarly, following steps 256 and 258, the key distribution server 76 proceeds to step 260. In step 260 the key distribution server 76 determines if it has received a forwarded message (i.e., a message forwarded by an access point 54 as a result of step 230 in FIG. 7). If no, the key distribution server 76 returns to step 252. If yes, the key distribution server 76 may process the message according to a predefined criteria as represented by step 262. For example, the key distribution server 76 may store the message in a file in memory 144 reserved for unauthorized messages. A system administrator may periodically review the messages in an attempt to ascertain information regarding unauthorized access attempts. Alternatively, the key distribution server 76 may simply delete such messages to prevent damage to the system integrity. Following step 262, the key distribution server 76 returns to step 252.

Figure 9:
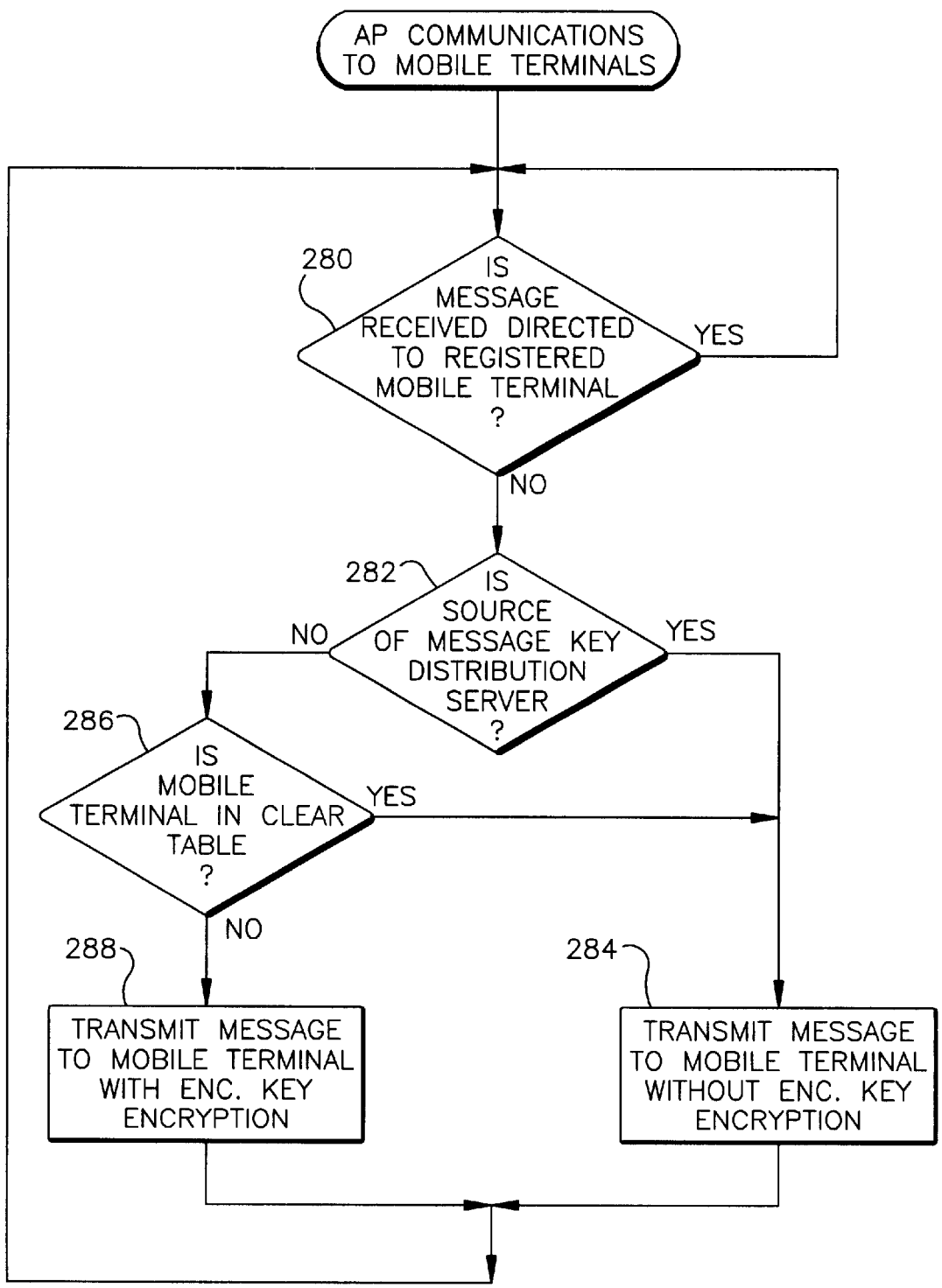
FIG. 9 is a flowchart representing the further operation of a given access point in accordance with the present invention.

Referring now to FIG. 9, the operation of each access point 54 is described in relation to messages which are received from the system backbone 52 and are directed to a mobile terminal registered to the access point 54. Specifically, in step 280 an access point 54 determines if it has received a message on the system backbone 52 directed to a mobile terminal (e.g., 66 or 72) which is registered to the access point 54. If no, the access point 54 continues to loop through step 280. If yes in step 280, the access point 54 proceeds to step 282 in which it determines if the source of the message is the key distribution server 76. In particular, the access point determines whether the source address in the header field represents that of the key distribution server 76. If yes, the access point transmits the message to the destination mobile terminal via its radio 120 without encryption via the ENCRYPT key as represented in step 284. Thus, a response packet (step 208) is received by a mobile terminal without encryption via the ENCRYPT key.

If the source of the message received from the system backbone is not the key distribution server 76, but rather is the host computer 68, for example, the access point 54 proceeds from step 282 to step 286. In step 286, the access point 54 checks its clear table 126 to determine if the mobile terminal to which the message is directed is included (e.g., BUT 72). If yes, the mobile terminal is intended to be able to receive messages without encryption via the ENCRYPT key. Hence, the access point 54 proceeds from step 286 to step 284 in which the message is transmitted to the mobile terminal without such encryption.

On the other hand, if the mobile terminal to which the message is directed is not in the clear table 126, it is intended that the communications between the access point 54 and the mobile terminal be carried out with standard encryption using the ENCRYPT key. Thus, the access point 54 proceeds in such case from step 286 to step 288. The access point 54 in step 288 proceeds to encrypt and transmit the message to the mobile terminal using the ENCRYPT key via the encryption engine 118. Following steps 288 and 284, the access point 54 returns to step 280.

As is described above primarily in connection with FIG. 6, a mobile terminal 66 which is authorized to communicate within the system 50 can gain access as long as the mobile terminal 66 and/or its operator knows the MASTER key. Supposing, for example, an unauthorized mobile terminal (UMT) 70 attempts to gain access, neither the UMT 70 nor its operator will know the MASTER key. Therefore, the UMT 70 will not be able to acquire the ENCRYPT key so as to engage in secure communications with an access point 54. Moreover, the only time the ENCRYPT key is transmitted via a wireless link is when it is encrypted via the MASTER key or the previous ENCRYPT key. Therefore, the UMT 70 cannot simply eavesdrop in order obtain the ENCRYPT key. A given access point 54 thereby screens any communications from a UMT 70. Since the UMT 70 will not appear in its clear table 126, the access point 56 serves as a gatekeeper to the system backbone 52 via steps 230 thru 234 (FIG. 7).

In the case of a basic mobile terminal (BMT) 72, on the other hand, it will be identified in the clear table 126 of the respective access point 54. Thus, the access point 54 will still permit the BMT 72 to gain non-secure access to the system backbone 52 when desired.

Figure 10:
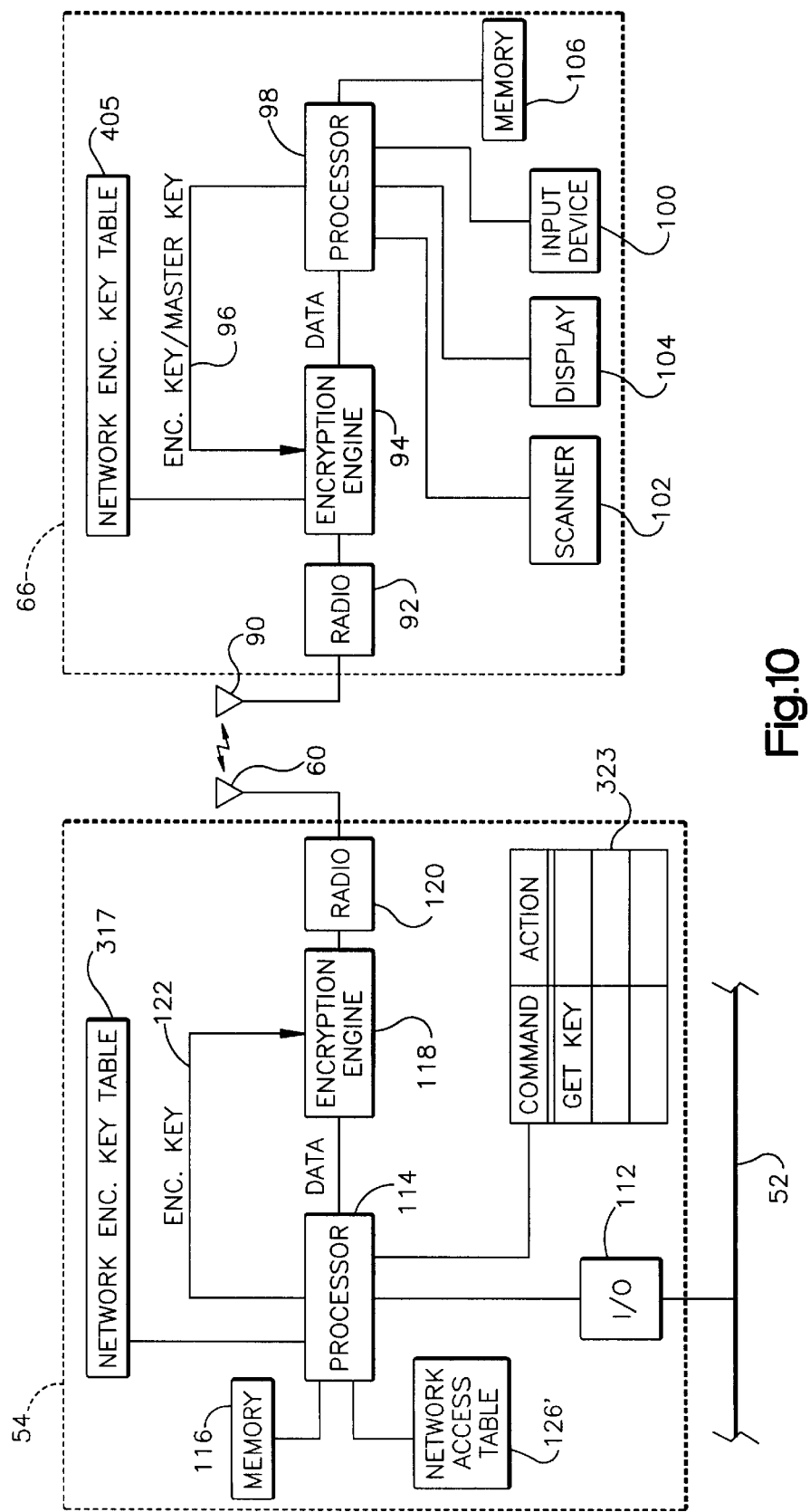
FIG. 10 is a block diagram representing a wireless communication between an access point and a mobile terminal in accordance with a second embodiment of the present invention.

Referring now to FIG. 10, a second embodiment of the present invention is illustrated. In particular, the configuration and operation of the access points 54, mobile terminals 66 and the key distribution server 76 are modified as discussed below. Generally speaking, before any communications may take place between a mobile terminal 66 and any other device on the network, the mobile terminal 66 must associate with an access point 54. When a mobile terminal 66 (or BMT 72 (FIG. 1)) initially enters the network or subsequently roams to a different cell, it must initiate association with the access point 54 corresponding to the cell in which it is in. The association request will either be for secure access to the network in the case of a mobile terminal 66 and for non-secure access in the case of a BMT 72.

It will be appreciated, based on the description which follows, that while the mobile terminal 66 can request an association with an access point 54, it is the access point 66 which makes the determination whether to accept or deny an association and thereby maintain network security. In making the decision to accept or deny an association, each access point 54 maintains a "network access" table 126' which is maintained in digital memory coupled to the processor 114. The network access table 126' differs from the "clear" table 126 in the previous embodiment in that the network access table 126' includes a list of all mobile terminals 66 and 72 which are to be permitted access to the network. The table 126' includes information therein identifying those mobile terminals which may be granted secure access (e.g., mobile terminals 66), and those mobile terminals which may be granted non-secure access (e.g., mobile terminals 72). Such information is provided periodically by the key distribution server 76 based on information provided by the system administrator. In essence, the information in the network access table 126' parallels that in the system device table 152 (FIG. 3).

The network access table 126' lists each mobile device (e.g., 66 or 72) which is permitted to associate with the access point 56 and indicates whether it is permitted to associate in secure or non-secure format. Therefore, the access point 56 accepts or denies an association based on the following rules which are discussed in more detail below. First, if the network address of the requesting mobile terminal is not listed in the network access table 126', the access point 56 denies association. Secondly, if the address of the mobile terminal is listed in the network access table 126', secure association is permitted only if the network access table 126' indicates that secure association is permitted and the mobile terminal has the appropriate ENCRYPT key for secure communications—otherwise, association is denied. Thirdly, if the address of the mobile terminal is listed in the network access table as being entitled to nonsecure access, non-secure association is permitted - otherwise association is denied. Upon association with an access point, communications between the mobile terminal and another network device via the access point 56 proceed in conventional manner.

Figure 11:
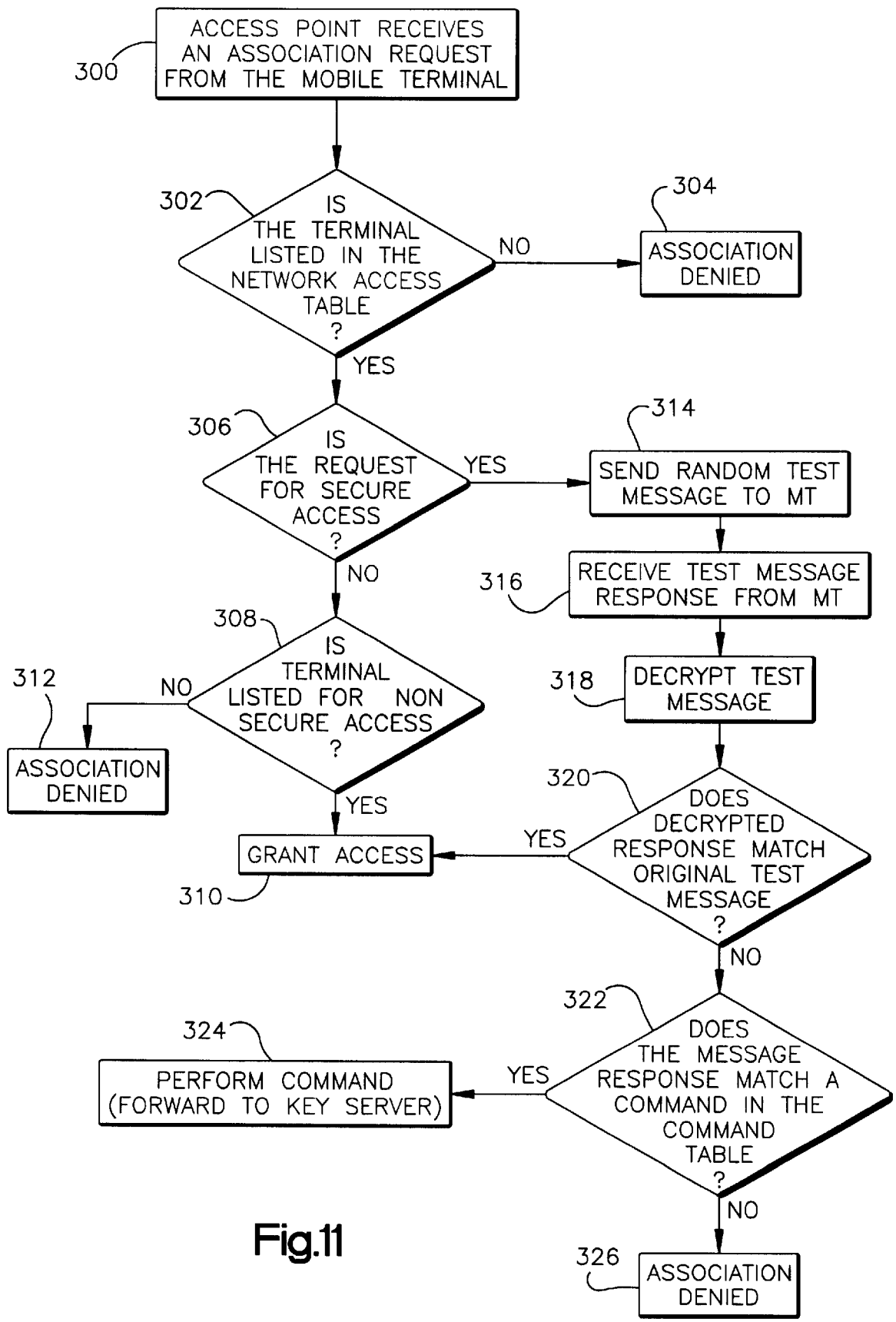
FIG. 11 is a flowchart representing the operation of a given access point in accordance with the second embodiment of the present invention.

The flowchart of FIG. 10 represents the operation of the access point association decision making process in more detail. As will be discussed below in connection with FIG. 11, each mobile terminal 66 or 72 within the network is designed to transmit an association request when desiring to register with a new access point, as is conventional. As represented in step 300 of FIG. 10, an access point 54 receives an association request presumably from a mobile terminal 66 or a BMT 72. In step 302, the access point 54 determines whether the association request came from a terminal identified in its network access table 126' based on the source address (i.e., network address or identification) of the association request. If the address of the mobile terminal requesting association is not listed in the network access table 126' as determined in step 302, association is denied as represented at step 304. By denying association, the access point 54 effectively denies the requesting mobile terminal access to the system network.

Alternatively, if in step 302 the network address of the requesting mobile terminal is found to be listed in the network access table 126', the access point 54 proceeds to step 306 to determine if the request requires secure access. Specifically, in step 306 the access point 54 determines whether the association request is for secure access. The mobile terminals (e.g., 66 and 72) are configured to indicate in their respective association requests whether the request is for secure or non-secure access.

If in step 306 the request is for non-secure access, the access point 54 proceeds to step 308. In step 308, the access point 54 again checks its network access table 126' to determine whether the requesting mobile terminal is identified as being permitted non-secure access. If yes, association with the access point 54 is granted as represented at step 310 and confirmation of association is transmitted by the access point 54 to the mobile terminal. Communications between the mobile terminal (e.g., BMT 72) and a network device are then carried out via the access point 54 in conventional manner. If no in step 308, the access point 54 denies association as represented in step 312.

Alternatively, if in step 306 the association request is for secure access, the access point 54 proceeds to step 314. In step 314, the access point 54 generates and transmits a randomly generated test message to the requesting mobile terminal. As discussed below with reference to FIG. 11, a mobile terminal seeking secured access association (e.g., mobile terminal 66) is configured to receive such test message. In addition, the mobile terminal is configured to respond to the test message by encrypting the test message using a network encryption key (i.e., ENCRYPT key), and transmitting the encrypted test message back to the access point 54. If the mobile terminal does not have the network encryption key, it is configured to transmit the non-encrypted test message back to the access point 54 as a response together with a command requesting the network encryption key as discussed below.

Following step 314, the access point 54 in step 316 receives the test message response from the requesting mobile terminal. The access point 54 stores the network encryption key (ENCRYPT key) in memory in the same manner discussed above. However, it is noted that FIG. 10 illustrates the network encryption key as a separate block 317. The processor 114 provides the network encryption key to the encryption engine 118 for purposes of receiving and decrypting the mobile terminal response as represented by step 318.

Next, in step 320 the access point 54 evaluates whether the mobile terminal has the correct network encryption key (ENCRYPT key). Provided the mobile terminal already has the ENCRYPT key, the response message will be the original test message encrypted with the ENCRYPT key by the mobile terminal. In step 320, the access point 54 compares the decrypted response with the original test message. If there is a match, association is granted by proceeding to step 310. Because the decrypted test message matches, it can be concluded that the mobile terminal requesting secure association has the correct ENCRYPT key for secure communications. Secure communications are then carried out between the mobile terminal and a network device via the access point 54. The access point itself may or may not decrypt the data field thereafter. Decryption may occur only at the network device, for example.

In the event there is not a match between the original test message and the decrypted test message in 320, the access point 54 determines in step 322 whether the non-decrypted response from the mobile terminal includes a command requesting the ENCRYPT key. For example, the command "GET KEY" may be sent by the mobile terminal requesting that the network encryption key be provided. As shown in FIG. 10, each access point 54 includes a command table 323 stored in memory. One of the commands corresponds to "GET KEY". Upon receiving such a command, the access point 54 is configured to take the action stored in the command table in association with the "GET KEY" command.

Specifically, if the response from the mobile terminal includes the "GET KEY" command as determined in step 322, the access point 54 proceeds to step 324. The access point 54 in step 324 proceeds to transmit a request for the ENCRYPT key to the key distribution server 76 in association with the mobile terminal requesting association. The key distribution server 76, as discussed below in relation to FIG. 13, responds to the request by transmitting the ENCRYPT key to the requesting mobile terminal via the access point 54. The transmitted ENCRYPT key is encrypted by the key distribution server 76 using the MASTER key which is stored in the key distribution server 76. Provided the mobile terminal receiving the ENCRYPT key has the MASTER key, the ENCRYPT key is obtained and the mobile terminal can decrypt and utilize such key in achieving association and access to the network for its secure communications. Specifically, after the mobile terminal recieves the ENCRYPT key, it may again initiate assoication with the access point 54 and this time it will have the appropriate ENCRYPT key to complete the association.

If, in step 322, the response from the mobile terminal does not include the "GET KEY" command or some other predefined command included in the table 323, the access point 54 denies the mobile terminal association as represented in step 326.

Figure 12:
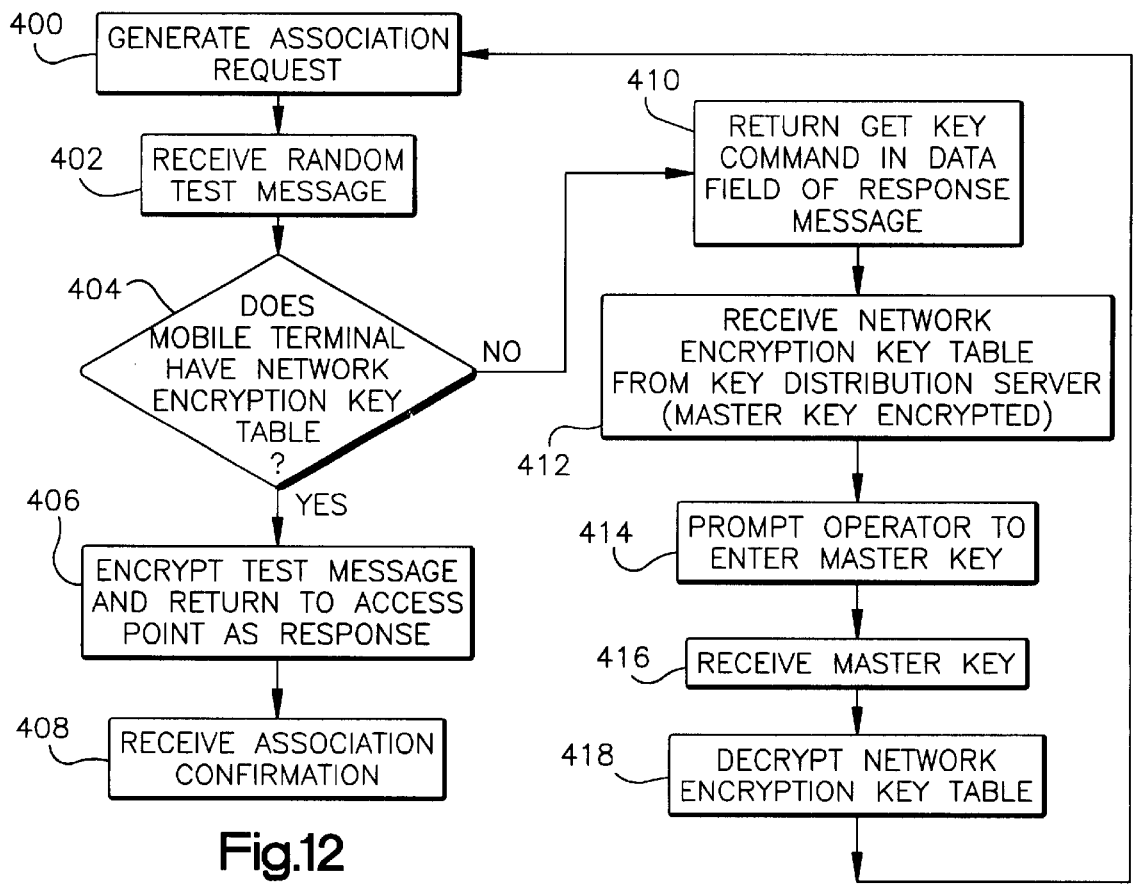
FIG. 12 is a flowchart representing the operation of a given mobile terminal in accordance with the second embodiment of the present invention.

Referring now to FIG. 12, the operation of a mobile terminal 66 requesting association is summarized. Specifically, the mobile terminal 66 seeking access to the network and/or roaming to a new access point initially generates and transmits an association request as represented at step 400. The access point receives and processes the access request as described above in steps 300 thru 314. Provided the mobile terminal is included in the network access table 126' of the access point 54 as being entitled to secure access, the mobile terminal 66 receives a random test message as represented in step 402. As discussed above, the random test message is generated and transmitted in step 314 of FIG. 11.

Next, in step 404 the mobile terminal 66 determines if it has the network encryption key (ENCRYPT key). (The mobile terminal 66 is configured to store the network encryption key in memory as discussed above (e.g., in a network encryption key table 405 as in FIG. 10)). If so, the mobile terminal 66 encrypts the test message using the ENCRYPT key and transmits the encrypted test message back to the access point 54 as shown in step 406. The access point 54 receives the encrypted test message and grants the mobile terminal 66 secure access provided the ENCRYPT key of the access point 54 matches that of the mobile terminal 66 (steps 320 and 310). Upon receiving confirmation of association from the access point 54 as represented by step 408, the mobile terminal 66 engages in secure communications using the ENCRYPT key in conventional manner.

If in step 404 the mobile terminal 66 does not have the network encryption key, the mobile terminal 66 generates and transmits a response to the test message back to the access point 54 as represented in step 410. Specifically, the response includes the test message together with a "GET KEY" command in its data field. The access point 54 processes the response as discussed above in relation to step 322, and requests that the key distribution server 76 provide the ENCRYPT key. As a result, the mobile terminal 66 receives the ENCRYPT key (encrypted using the MASTER key) from the key distribution server 76 as shown in step 412. Next, in step 414 the mobile terminal 66 prompts the operator to enter the MASTER key should the MASTER key not have previously been entered.

In step 416 the mobile terminal 66 waits to receive the MASTER key. Upon receiving the MASTER key, the mobile terminal 66 decrypts the ENCRYPT key provided by the key distribution server 76 as represented in step 418. Provided the mobile terminal 66 has the correct MASTER key, the mobile terminal 66 will then have available the ENCRYPT key following step 418. Thereafter, the mobile terminal 66 returns to step 400 and reinitiates the process. Since the mobile terminal 66 now has the ENCRYPT key, association via the access point 54 will thus be permitted. Notably, the process involves two levels of encryption which enables the mobile terminal 66 to receive the network encryption key for secure communications while still providing limited access for non-secure communications.

Figure 13:
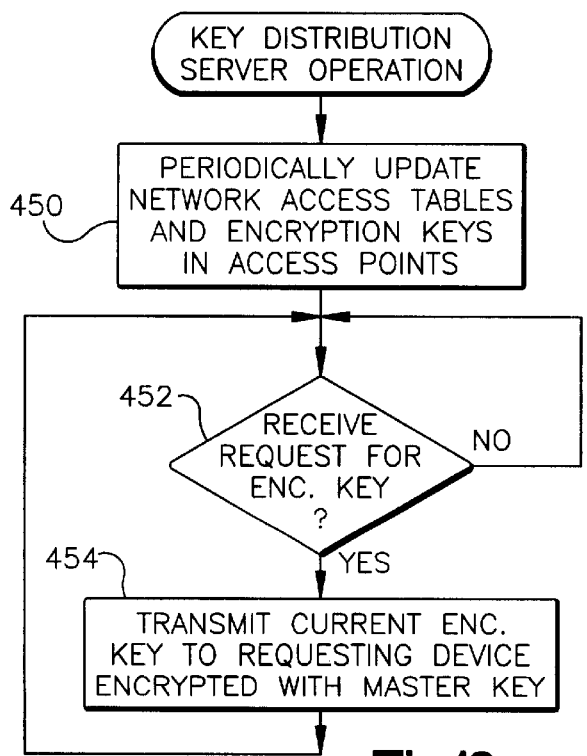
FIG. 13 is a flowchart representing the operation of the key distribution server in accordance with the second embodiment of the present invention.

FIG. 13 summarizes the operation of the key distribution server 76 in accordance with the second embodiment. In step 450, the key distribution server 76 periodically transmits updates to all of the access points 54. The updates indicate the devices which are entitled to secure and non-secure access to the network. Such information is based on information input to the key distribution server by the system administrator, and is used to generate the network access tables 126' in the access points 54.

In step 452, the key distribution server 76 determines if it has received a request for ENCRYPT key from an access point 54 (step 324). If yes, the key distribution server 76 transmits the ENCRYPT key (encrypted by the MASTER key) to the requesting mobile terminal via the access point 54 as shown in step 454. The key distribution server 76 then returns to step 452. Similarly, if a request is not received in step 452, the key distribution server 76 waits to receive such a request.

The different embodiments of the invention discussed herein share many of the same advantages as well as advantages unique to the particular embodiment. For example, one embodiment may be more compliant with various aspects of a standard protocol (e.g., IEEE 802.11) than another. In any event, both provide convenient access to mobile terminals both via secure access and non-secure access.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. An access point, comprising:
   a transceiver for wirelessly communicating with mobile terminals;
   an interface for coupling the access point to a system backbone;
   an encryption engine for encrypting messages using a first encryption key which are to be transmitted to a mobile terminal via the transceiver, and for decrypting messages using the first encryption key which are received from the mobile terminal via the transceiver; and
   operational means for determining whether a message received via the transceiver has been encrypted using the first encryption key and, based on such determination, selectively forwarding the message to a destination on the system backbone specified in the message if the message had been encrypted, and at least one of forwarding the message to a predefined destination on the system backbone to selectively request registration onto the system backbone and receipt of a second encryption key, blocking the message from being place onto the system backbone, and placing the message onto the system backbone if the message had not been encrypted.

2. The access point of claim 1, further comprising a table including a list of devices authorized to communicate on the system backbone without encryption based on the first encryption key.

3. The access point of claim 2, wherein the access point compares the source of the message with the devices included in table and if the message had not been encrypted but the source of the message is included in the table, the access point is configured to place the message onto the system backbone.

4. The access point of claim 1, wherein the operational means determines whether a message received via the transceiver is directed to a key distribution server coupled to the system backbone and passes the message onto the system backbone if it is determined that the message is directed to the key distribution server.

5. The access point of claim 1, wherein the operational means cooperates with the encryption engine to encrypt messages sent to mobile terminals via the transceiver selectively in order that messages directed to mobile terminals meeting a predefined criteria are encrypted and messages directed to mobile terminals meeting a different predefined criterial are not encrypted.

6. An access point, comprising:
   a transceiver for wirelessly communicating with mobile terminals;
   an interface for coupling the access point to a system backbone;
   a memory which stores mobile terminal identifiers indicating which mobile terminals are to be permitted access to the system backbone, and whether such permitted access is secure access or non-secure access;
   control means, operatively coupled to the transceiver and the memory, for determining whether a received communication is from a mobile terminal which is permitted access to the system backbone and allowing selective registration of a mobile terminal for receiving secure access; and
   means for processing the received communication based on whether the mobile terminal is permitted access.

7. The access point of claim 6, wherein the access point denies the mobile terminal access if the control means determines that the mobile terminal is not permitted access.

8. The access point of claim 6, wherein the access point grants the mobile terminal non-secure access to the system backbone if the mobile terminal is identified in the memory as being permitted non-secure access.

9. The access point of claim 6, wherein the access point grants the mobile terminal secure access provided the mobile terminal is identified in the memory as being permitted to secure access and the mobile terminal exhibits knowledge of a first level of encryption.

10. The access point of claim 6, wherein the access point grants the mobile terminal secure access provided the mobile terminal is identified in the memory as being permitted to secure access, and the access point is able to obtain a first level of encryption for the mobile terminal from a source on the system backbone.

11. The access point of claim 10, wherein the access point obtains the first level of encryption from the source using a second level of encryption.

* * * * *